(No Model.)
D. HIGHAM.
PREVENTION OF SPARKING IN DYNAMO ELECTRIC MACHINES AND ELECTRIC MOTORS.
No. 399,401.                   Patented Mar. 12, 1889.
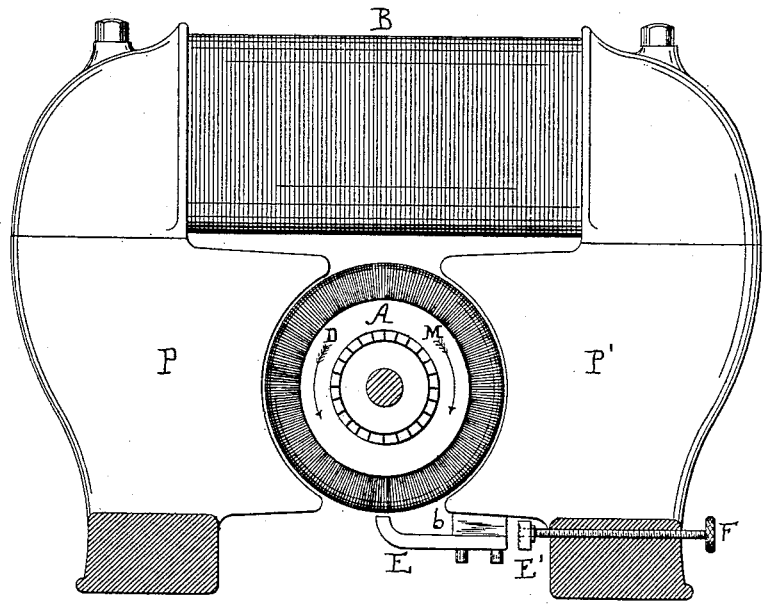
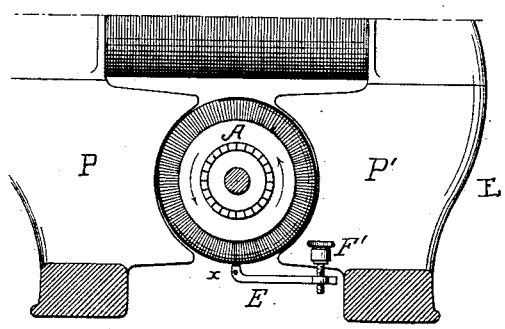
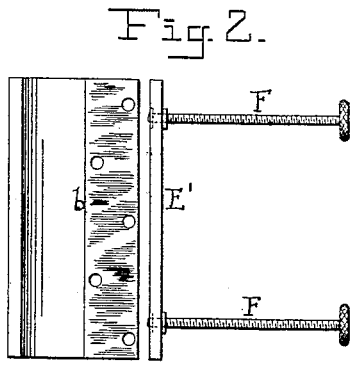
Witnesses:
David S. Williams
Alx. Barkoff
Inventor:
Daniel Higham
by his Attorneys
Howson & Howson

UNITED STATES PATENT OFFICE.

DANIEL HIGHAM, OF PHILADELPHIA, PENNSYLVANIA, ASSIGNOR TO THE HIGHAM ELECTRIC LIGHT COMPANY, OF ROCKLAND, MAINE.

PREVENTION OF SPARKING IN DYNAMO-ELECTRIC MACHINES AND ELECTRIC MOTORS.

SPECIFICATION forming part of Letters Patent No. 399,401, dated March 12, 1889.

Application filed June 7, 1888. Serial No. 276,343. (No model.)

*To all whom it may concern:*

Be it known that I, DANIEL HIGHAM, a citizen of the United States, and a resident of Philadelphia, Pennsylvania, have invented certain Improvements in the Prevention of Sparking in Dynamo-Electric Machines and Electric Motors, of which the following is a specification.

My invention relates to that class of dynamo-electric machines and electric motors in which the line of neutrality in the magnetic field is not appreciably shifted by the regulating means employed.

The object of my invention is to provide means by which the commutating-line will be given a more efficient position in the magnetic field, together with a more precise adjustment for producing the conditions of non-sparking at the commutator-brushes.

My invention may be applied to any style of dynamo-electric machine or motor in which the armature and field-magnet currents are constant or else vary simultaneously, (as would be the case in a series machine,) and my improvements are particularly applicable to constant-current dynamos in which the armature-speed is varied for the purpose of regulation by means of a regulating device at the driving-engine, such as described in the Letters Patent granted to myself and E. T. Higham, May 10, 1887, No. 362,510.

In carrying my invention into effect, I make use of a suitably-shaped bar of iron or other magnetic metal to conduct magnetic lines from the field-magnet to the short-circuited armature-coils and provide means whereby the intensity of the magnetic field passing through the bar may be varied, as desired.

In the accompanying drawings, Figure 1 is a side view, partly in section, of a dynamo-electric machine or electric motor provided with my improvement. Fig. 2 is a plan view of the magnetic conducting-bar and adjusting-piece detached from the machine, and Fig. 3 is a view of a modification.

A is the armature, which may be of any suitable construction, and B is the field-magnet, between whose pole-pieces P P' the armature revolves. Adjacent to one of these pole-pieces I apply a magnetic conducting-bar, E, which may be fixed to any convenient part of the machine. In the present instance I have shown the bar as secured to one of the pole-pieces, but separated from the magnetic contact therewith by means of a piece, b, of brass, or other suitable non-magnetic material. The outer or free end of this conducting-bar E extends to within rotating clearance of those coils of the armature which are short-circuited by the commutator-brushes during the rotation of the armature. When the machine is run as a dynamo, the armature will revolve in this instance in the direction of the arrow D, and when run as a motor, in the direction of the arrow M. In connection with this conducting-bar I provide means whereby the magnetic field passing through the said conducting-bar can be adjusted or regulated in intensity to any desired degree to produce the conditions of non-sparking. For this purpose I apply at the rear of the conducting-bar E an adjusting-piece, E', of soft iron, which is closely adjacent to the pole-piece and may be adjusted toward or from the conducting-bar E to decrease or increase the resistance of the magnetic circuit passing through said bar. In the present instance I have shown this adjusting-piece as carried by and adjustable by means of two screw-rods, F, passing through the base of the machine; but it will be readily understood that other means of obtaining the adjustment may be provided. For instance, in Fig. 3 I have shown a construction in which the front end of the bar is pivoted or otherwise suitably supported at $x$, while the rear end may be adjusted toward or from the pole-piece by means of adjusting-screws F' turning in suitable fixed bearings.

The advantages of the adjustable magnetic conducting-bar are, first, that the intensity of the magnetic field through which the short-circuited armature-coils pass can be adjusted with great nicety, and, second, no perceptible lead need be given to the brushes.

In an application for a patent filed by me October 3, 1887, Serial No. 251,339, I described means for the prevention of sparking in dynamo-electric machines and motors; but those means were applicable only to that class of dynamos and motors in which either the armature or field-magnet currents are varied separately. The said means consisted of electro-magnets secured to the pole-pieces. In my present invention I employ a magnetic conducting-bar which is not an electro-magnet, for the reason that it is incapable of setting up any magnetic lines of itself. It is therefore simply a conducting-bar in the true sense and would not be of any service in other types of machines other than the class mentioned in this application.

I claim as my invention—

1. A dynamo-electric machine or electric motor in which the armature and field-magnet currents are constant or vary simultaneously and having a magnetic conducting-bar not an electro-magnet adjacent to a pole-piece of the field-magnet and acting on the short-circuited armature-coils.

2. A dynamo-electric machine or electric motor having a magnetic conducting-bar acting on the armature-coils, which are being short-circuited by the commutator-brushes during the rotation of the armature, and means for adjusting the resistance of the magnetic circuit passing through the said bar.

3. A dynamo-electric machine or electric motor having a magnetic conducting-bar acting on the short-circuited armature-coils, and an adjustable piece adjacent to the field-pole and movable toward and from the said conducting-bar, as and for the purpose set forth.

In testimony whereof I have signed my name to this specification in the presence of two subscribing witnesses.

DANIEL HIGHAM.

Witnesses:
HARRY SMITH,
HENRY HOWSON.